United States Patent
Nam

(10) Patent No.: US 6,604,194 B1
(45) Date of Patent: Aug. 5, 2003

(54) PROGRAM UPDATING METHOD AND APPARATUS FOR COMMUNICATION TERMINAL SYSTEM

(75) Inventor: Cha Hee Nam, Suwon (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/442,507

(22) Filed: Nov. 18, 1999

(30) Foreign Application Priority Data

Dec. 18, 1998 (KR) .......................................... 98-56063

(51) Int. Cl.⁷ ................................................ G06F 9/00
(52) U.S. Cl. .......................................... 713/2; 709/221
(58) Field of Search ........................... 365/185.33, 221; 370/254, 392; 380/260; 709/221; 711/5; 713/1, 2, 100, 200, 300; 714/6, 8; 717/171

(56) References Cited

U.S. PATENT DOCUMENTS

| | | | | |
|---|---|---|---|---|
| 4,636,583 A | * | 1/1987 | Bidell et al. ................. 375/365 |
| 5,124,977 A | * | 6/1992 | Kozaki et al. ............... 370/392 |
| 5,327,531 A | * | 7/1994 | Bealkowski et al. ........... 713/1 |
| 5,598,563 A | * | 1/1997 | Spies ........................... 709/321 |
| 5,737,318 A | * | 4/1998 | Melnik ........................ 370/254 |
| 5,805,882 A | * | 9/1998 | Cooper et al. ................. 713/2 |
| 5,822,581 A | * | 10/1998 | Christeson ..................... 713/1 |
| 5,835,760 A | * | 11/1998 | Harmer .......................... 713/2 |
| 6,058,047 A | * | 5/2000 | Kikuchi ................. 365/185.33 |
| 6,092,190 A | * | 7/2000 | Lee ............................... 713/2 |
| 6,128,732 A | * | 10/2000 | Chaiken ......................... 713/2 |
| 6,149,316 A | * | 11/2000 | Harari et al. ................. 365/218 |
| 6,182,187 B1 | * | 1/2001 | Cox et al. ........................ 711/5 |
| 6,247,126 B1 | * | 6/2001 | Beelitz et al. .................. 713/1 |
| 6,272,628 B1 | * | 8/2001 | Aguilar et al. ................. 713/2 |
| 6,275,436 B1 | * | 8/2001 | Tobita et al. ........... 365/189.01 |
| 6,279,153 B1 | * | 8/2001 | Bi et al. ..................... 717/171 |
| 6,308,265 B1 | * | 10/2001 | Miller ........................... 713/2 |
| 6,393,559 B1 | * | 5/2002 | Alexander ..................... 713/2 |
| 6,473,856 B1 | * | 10/2002 | Goodwin et al. ............... 713/2 |

\* cited by examiner

Primary Examiner—Thomas Lee
Assistant Examiner—Albert Wang
(74) Attorney, Agent, or Firm—Birch, Stewart, Kolasch & Birch, LLP

(57) ABSTRACT

A program updating method and apparatus update a system initialization code as well as a master code to a new version from a remote site. The program updating method according to the present invention includes a first step of determining whether or not the system initialization code source is executed, a second step of executing the system initialization code copy if the system initialization code source is not executed, a third step of determining whether or not a master code requires updating and thereby updating the same with a master code or a server according to the result of the above determination after the system initialization code source is executed, a fourth step of determining whether or not the system initialization code requires updating after updating the master code, and a fifth step of sequentially updating the system initialization code source/copy with a system initialization code of a server if it is determined that the system initialization code requires updating.

13 Claims, 7 Drawing Sheets

COVENTIONAL ART

PROGRAM UPDATING METHOD AND APPARATUS FOR COMMUNICATION TERMINAL SYSTEM

BACKGROUND OF THE INVENTION

1. Field of the Invention

The present invention relates to a communication terminal system and, in particular, to a method and apparatus for updating a communication terminal system's program at a remote site using a network.

2. Description of the Prior Art

In current systems, program updating can be easily performed by the use of a flash memory instead of a Read Only Memory(ROM). Particularly, in a system which updates a program to a new version through a network, a flash memory is used.

The prior art with respect to a program updating method and apparatus for a communication terminal system is described with reference to the accompanied drawings.

FIG. 1 is a block diagram showing a constitution of an example of a communication system according to the conventional art.

A communication terminal system includes a flash memory 130 for storing a program for the system operation control, a system memory 140 for storing operational data according to the operation of the system, a CPU (Central Processing Unit) 110 for controlling the entire operation of the system, a network interface unit 150 for communicating with a remote server, a user interface unit 160 for inputting signals using a keyboard or a mouse, a VGA (Video Graphic Array) interface unit 170 for outputting video signals by a display apparatus (not shown), and a system control unit 120 connected with the CPU 110, the flash memory 130, the system memory 140, the network interface unit 150, the user interface unit 160, and the VGA interface unit 170. A bus is connected with the remote server in which a new version of data exists via the network interface unit 150, and the CPU 110 updates the data stored in the flash memory 130 to the new version of data which exists in the remote server.

The data stored in the flash memory 130, as shown in FIG. 2, comprises a system initialization code source, a master code source, and a master code copy. The system initialization code source is positioned starting from an '0'(HEX) address of the flash memory 130. When the system is powered "ON" the operation of the CPU 110 starts from the '0'(HEX) address. Therefore the CPU 110 executes the system initialization code to initialize the system when the power is "ON".

The master code source is a basic program of the system for controlling the network operation, VGA operation, etc. The master code copy is reproduced from the master code source. The data updating process of the flash memory 130 will be explained referring to FIG. 1 and FIG. 3.

FIG. 3 is a flow chart of an example of the data updating process according to the prior art.

When the system is powered "on", the CPU 110 controls the system control unit 120 so as to output the '0'(HEX) address of the flash memory 130. When the system control unit 120 transfers the system initialization code source stored in the '0'(HEX) address of the flash memory 130 to the CPU 110, the system initialization code source is executed to initialize the system. After system initialization, the CPU 110 loads the master code source and copy stored in the flash memory 130 into the system memory 140 by controlling the system control unit 120. The reason thereof is to properly operate the program already being executed when updating the data stored in the flash memory 130.

The CPU 110 checks the check sum of the master code source, and if there is no malfunction, determines the master code source as normal and thus executes the master code source stored in the system memory 140. Afterwards, the CPU searches a server and determines whether the master code stored in the flash memory 130 requires an update or not by comparing the master code source stored in the flash memory 130 with the master code of the server.

If the master code of the flash memory 130 requires an update to a new version, the CPU 110, after updating the master code copy of the flash memory 130 with the master code of the server, updates the master code source of the flash memory 130 and turns the power "OFF/ON", thereby actuating the system with an updated master code.

If the master code does not require an update, the CPU 110 implements the following function according to the signal of a keyboard or a mouse input through the user interface unit 160 and displays a progress on a display apparatus through the VGA interface unit 170.

A master code in an abnormal state will now be explained.

After the system initialization, the checksum of the master code source is checked and the master code is determined as abnormal, the CPU 110 checks the checksum of the master code copy in order to determine if there is something wrong with the master code copy.

If the master code copy is normal, the CPU 110 executes the master code copy, searches a server through the network interface unit 150, and determines whether the master code copy needs an update by comparing the master code copy stored in the flash memory 130 with the master code of the server.

If the master code copy requires an update, the CPU 110, after updating the master code source of the flash memory 130 with the master code of the server, updates the master code copy and turns the power "OFF/ON", thereby actuating the system with an updated master code.

If the master code copy does not require an update, the CPU 110 updates the master code source stored in the flash memory 130 with the master code of the server and turns the power "OFF/ON", thereby actuating the system with an updated master code.

The reason why the master code source is updated although it does not require an update when compared with the server is because the master code source was determined damaged before executing the master code copy.

As described above, in a communication terminal system which updates a program through a network, flash memories are more popularly used. In order to update a program to a new version, a flash memory area to be updated should be deleted and a new version of program should be stored thereon.

However, there is a problem that when a power failure arises during program updating, the program in an area to be updated is deleted and cannot be restored and thus program updating is not performed correctly, resulting in an inoperable system. To solve this problem, in the prior art, the flash memory is provided with the master code copy as well as the master code source. That is, if the master code source is lost due to a power failure or the like during the master code source updating, the CPU 110 executes the system with the master code copy, and the master code source is updated with the master code of the server. As described above, the problem can be solved by providing the flash memory with the master code copy.

Unlike the master code, however, there is another problem that if a system initialization code is lost or incorrectly updated when updating the same, the system is not operable. The reason therefor is that since a system initialization code starts from the '0'(HEX) address of the flash memory area, the system initialization code copy is not placed at the '0'(HEX) address in the flash memory area though the system initialization code copy is provided. Therefore, the operation of the CPU 110 starts from the '0'(HEX) address of the flash memory when the system is powered "ON" though there is a problem with the system initialization code, and thus the system initialization code source with the problem is executed, so that it is impossible to update the system initialization code to a new version or the existing version.

SUMMARY OF THE INVENTION

Accordingly, an object of the present invention, for correcting the conventional problems is to provide a program updating method and apparatus for removing a system inoperable state or wrong operation state due to a power failure during program updating and by providing a memory with a circuit which designates a save area of a system initialization code copy while storing the system initialization code copy in the memory.

A program updating apparatus according to the present invention to achieve the object above includes a section for determining whether a system initialization code source operates normally in a communication terminal system which updates the data of a memory from a remove server using a network, a section for executing the system initialization code copy if the system initialization code source is not operated, and a section for temporarily resetting the system if the system initialization code source is not operated.

A program updating method according to the present invention comprises a first step for determining whether a system initialization code source is executed or not, a second step for executing a system initialization code copy if the system initialization code source is not executed, a third step for determining whether a master code requires updating or not when the system initialization code source or system initialization code copy is executed and updating the same with a master code of a server according to the result of the determination, a fourth step for determining whether the system initialization code requires update or not after updating the master code, and a fifth step for sequentially updating the system initialization code source and copy with a system initialization code of the server if it is determined that the system initialization code requires updating.

DETAILED DESCRIPTION OF THE PREFERRED EMBODIMENTS

Hereinafter, an embodiment of a program updating method and apparatus according to the present invention will be explained in detail with reference to the accompanied drawings.

Figure 1:
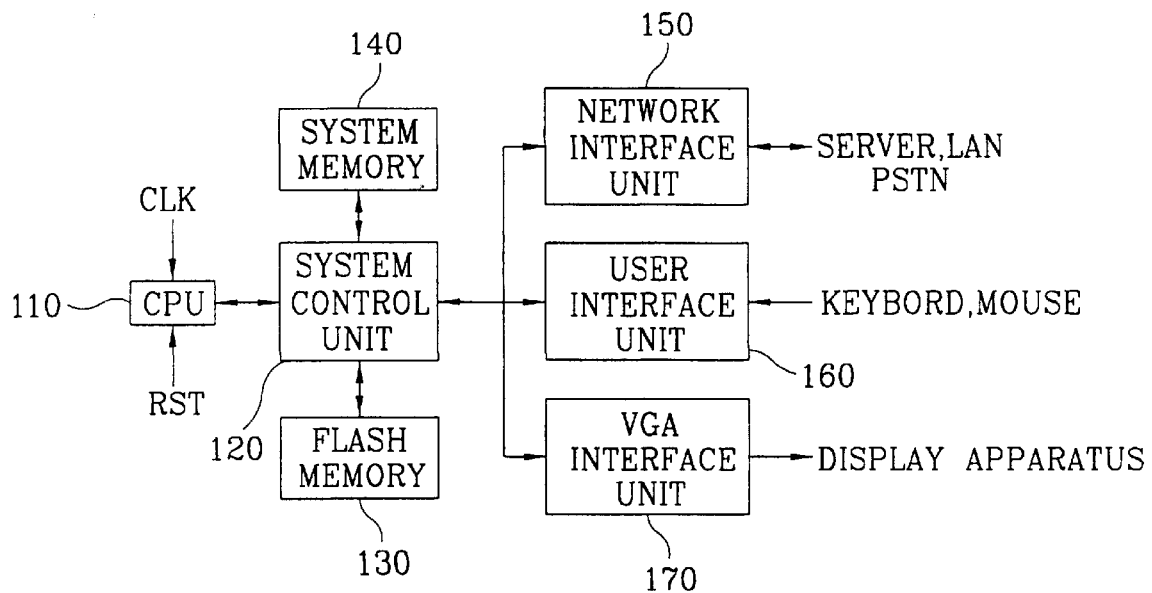
FIG. 1 is a block diagram of an apparatus for an example of the prior art.
Figure 2:
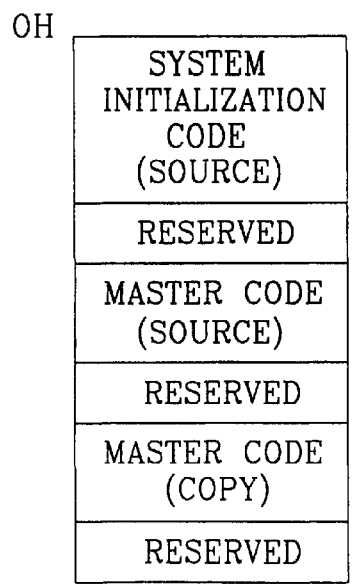
FIG. 2 is a view showing a constitution of a flash memory in FIG. 1.
Figure 3:
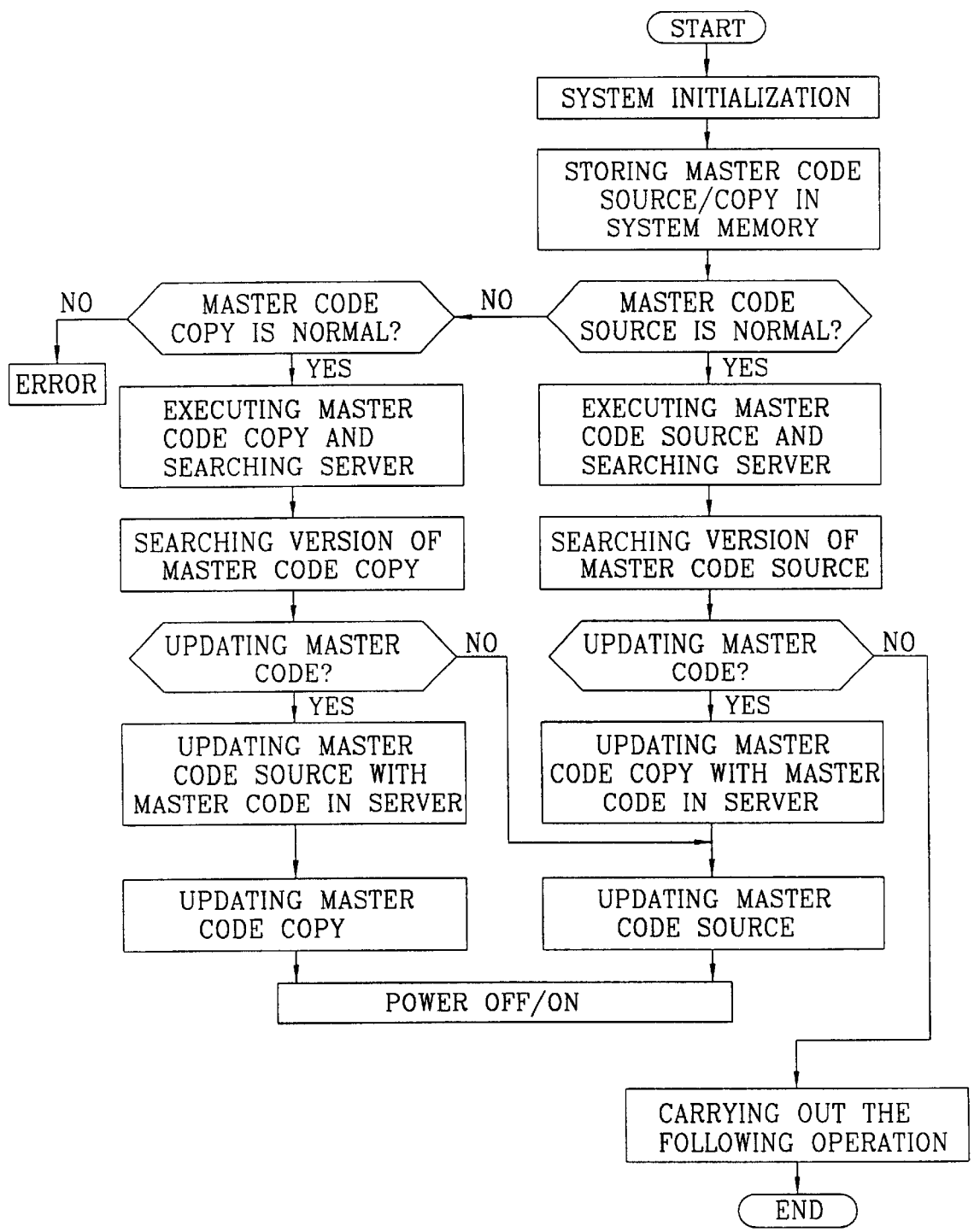
FIG. 3 is a flow chart for the example of the prior art.
Figure 4:
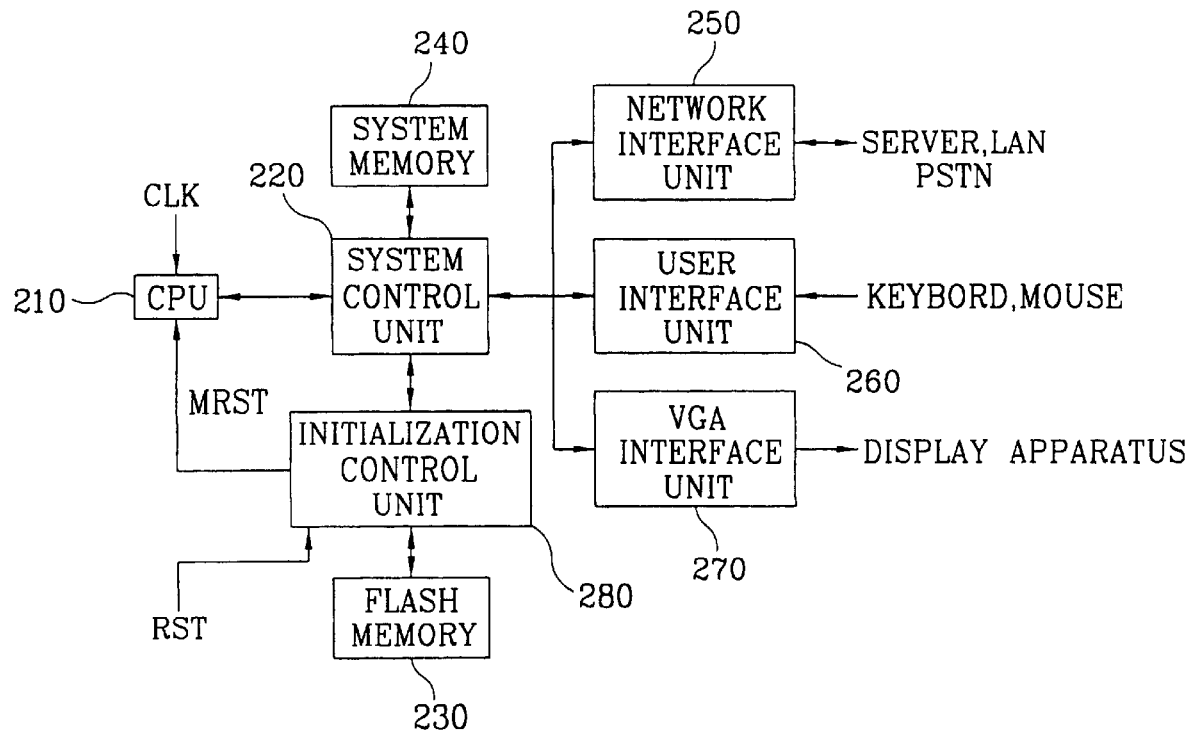
FIG. 4 is a block diagram of an apparatus for an embodiment of the present inventions.

FIG. 4 is a block diagram showing a constitution of the program updating apparatus according to an embodiment of the present invention.

Figure 5:
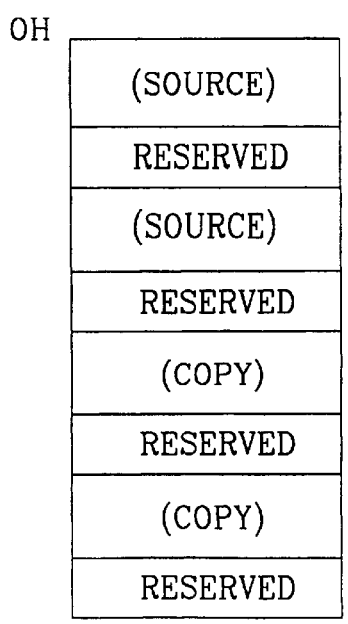
FIG. 5 is a view showing a constitution of a flash memory in FIG. 4.

FIG. 5 is a view showing an example of data stored in a flash memory of FIG. 4.

In a communication terminal system comprising a flash memory 230 for storing a program for system operation control, a system memory 240 for storing operational data according to the operation of the system, a CPU 210 for controlling the entire operation of the system, a network interface unit 250 for communicating with a remote server, a user interface unit 260 for inputting signals using a keyboard or a mouse, a VGA interface unit 270 for outputting video signals by a display apparatus, and a system control unit 220 connected with the CPU 210 via a CPU bus and connected to the flash memory 230, the system memory 240, the network interface unit 250, the user interface unit 260, the VGA interface unit 270 and a bus, the present invention further comprises an initialization code control unit 280. If a reset logic 280-1 and a system initialization code source are not executed normally, the initialization code control unit 280 comprises an address control unit 280-2 (FIG. 7) which provides the flash memory 230 with an address for executing a system initialization code copy.

As shown in FIG. 5, the flash memory 230 stores a system initialization code source, system initialization code copy, master code source, and master code copy in their respective areas.

The system initialization code source, master code source and master code copy are the same as described in the prior art section. The system initialization code copy is reproduced from the system initialization code source and used to initialize the system when the system initialization code source is damaged.

In a communication terminal system according to the present invention, hen data in the flash memory 230 needs update, the CPU 210 receives new data from a server and updates the data in the flash memory. At this time, the CPU updates the system initialization code as well as the master code. The constitution of the initialization code control unit 280 for updating the system initialization code will be described referring to FIGS. 7 and 8.

Figure 7:
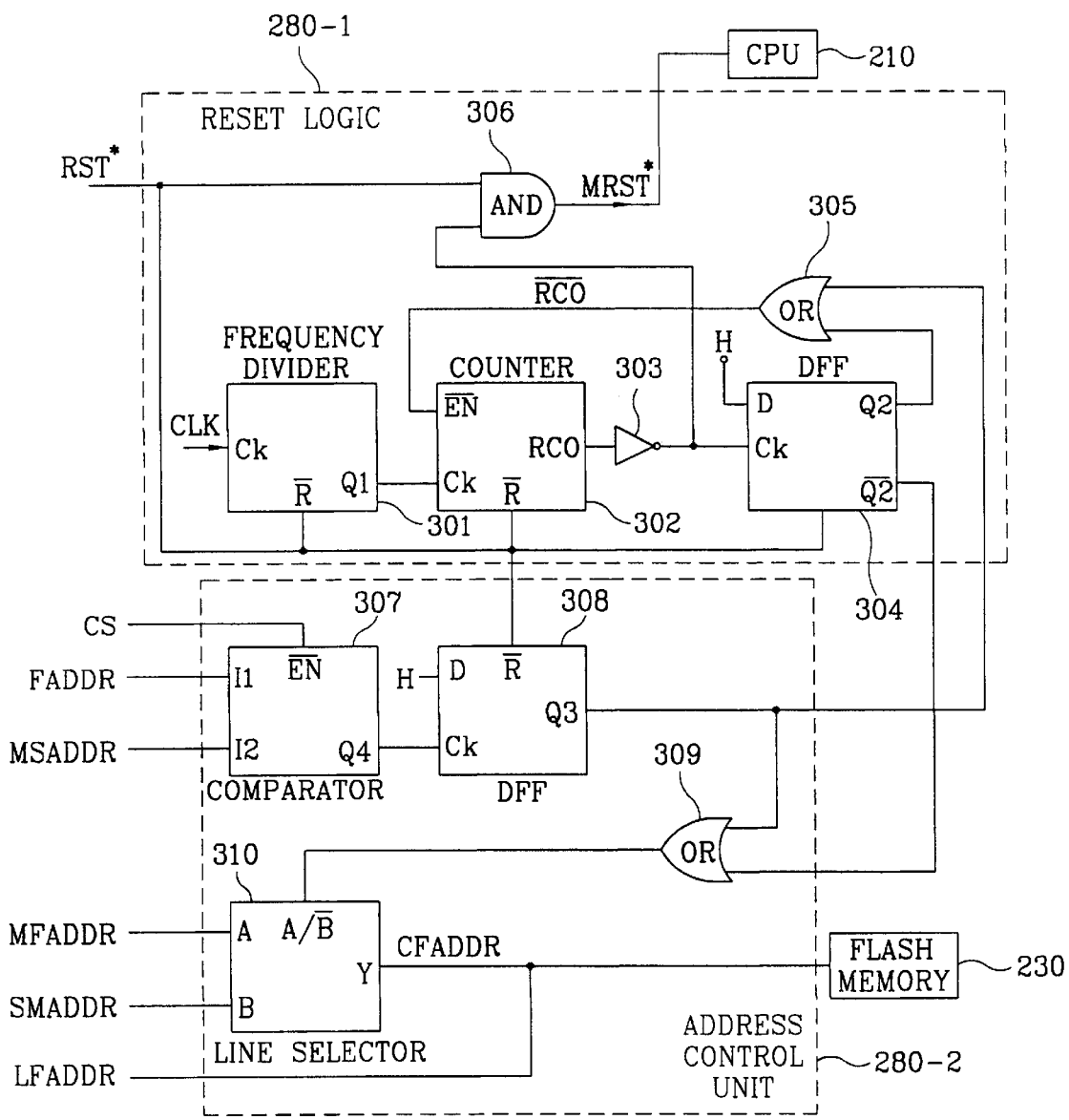
FIG. 7 is a circuit diagram showing an initialization code control unit including reset logic and an address control unit in FIG. 4 according to an embodiment of the present invention.
Figure 8:
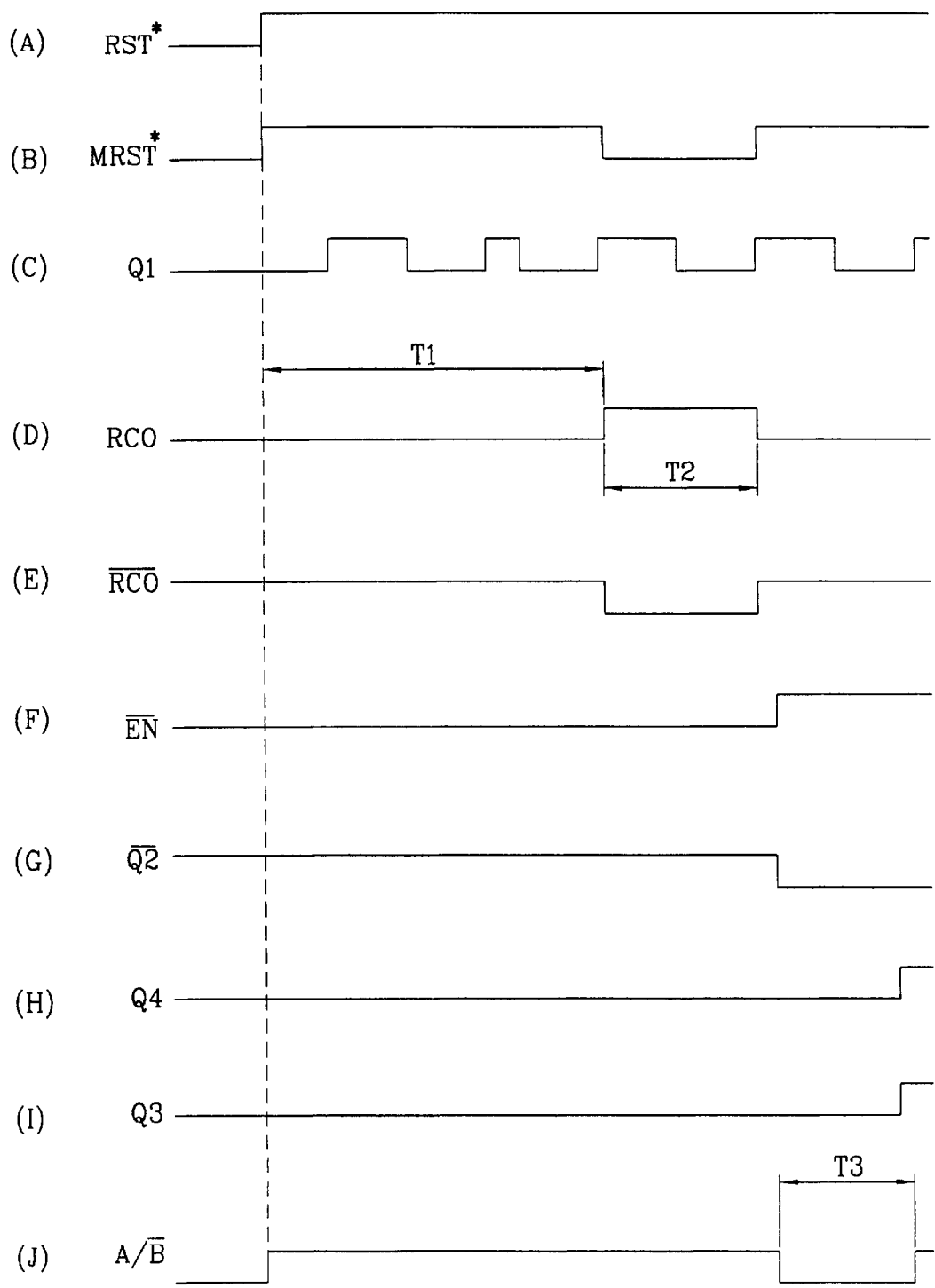
FIGS. 8(a) through 8(j) are examples of operation timing diagrams for the embodiment of the present invention.

FIG. 7 is a circuit diagram showing a constitution of the initialization code control unit 280 comprising the reset logic 280-1 and the address control unit 280-2 according to an embodiment of the invention.

FIGS. 8(a) through 8(j) are operation timing diagrams for an embodiment of the present invention.

The reset logic 280-1 comprises a frequency divider 301 for frequency-dividing clock signals when the power is "ON", a counter 302 for counting the output signal Q1 of the frequency divider, an inverter 303 for inverting the output of the counter 302 and outputting the result to an AND gate 306 and a D flip-flop 304(hereinafter the first D F/F), the first D F/F 304 for latching a high signal at the rising edge of the output signal of the inverter 303, a first OR gate 305 for ORing the output Q2 of the first 1 D F/F and the output of a D flip-flop 308(hereinafter the second D F/F) of the address control unit 280-2 and outputting the result to an enable terminal of the counter 302, and the AND gate 306 for ANDing the output of the inverter 303 and a reset signal(RST*) and outputting a main reset signal(MRST*) to the CPU 210.

The address control unit 280-2 comprises a comparator 307 which compares the address(FADDR) of the flash memory 230 with a starting address(MSADDR) of the master code source physically fixed, and then, outputs a high signal if the two addresses are identical or a low signal if they are not identical, the second D F/F 308 which latches a high signal at the rising edge of the output signal Q4 of the comparator 307, a line selector 310 which selects one of a normal higher flash address(MFADDR) and a higher address of the system initialization code copy physically fixed according to the input signal of a selector terminal A/$\overline{B}$, a second OR gate 309 which ORs the output signal of the second D F/F 308 and the output signal of the first D F/F 304 and outputs the result to the selector terminal of the line selector 310.

In FIG. 7, a higher address MFADDR represents an address required for dividing the code areas stored in the flash memory into each code area, and a lower address LFADDR represents an address applied commonly to each of the code areas stored in the flash memory.

While a reset signal(RST*)[* mark is active when "low"] is low as shown in FIG. 8(a) with the power turned "ON", the frequency divider 301, counter 302, first D F/F 304, and second D F/F 308 is reset and the output signal(MRST*) of the AND gate 306 becomes low as shown in FIG. 8(b) by the reset signal(RST*) which is low and thereby the system remains in reset state.

After that, when the reset signal becomes high as shown in FIG. 8(a), the output of the AND gate 306 (MRST*) becomes high as shown in FIG. 8(b) since the output of the inverter 303 which inverts the low output (RCO) of the counter 302. The frequency divider 301 frequency-divides the clock signal (CLK) of an oscillator (not shown), and the counter 302 which has applied the low signals Q2 and Q3 of the first D F/F 304 and the second D F/F 308 to an enable terminal $\overline{EN}$ through the first OR gate 305 counts the output signal Q1 of the frequency divider 301 as shown in FIG. 8(c).

At the same time, the line selector 310 which has input the high output signal $\overline{Q2}$ of the first D F/F 304 to the selector terminal A/$\overline{B}$ through the second OR gate 309 outputs a normal higher address (MFADDR) input through the system control unit to the flash memory 230.

Accordingly, the system initialization code source stored in an '0'(HEX) address of the flash memory is executed to initialize the system.

When the system initialization code source is executed successfully, the CPU 210 jumps a flash address(FADDR) to the address area(MSADDR) of a master code source to execute the master code source.

Whereupon, since the flash address (FADDR) and a starting address of the master code source physically fixed are identical, the output of the comparator 307 becomes high and the second D F/F 308 which has latched this signal outputs a high signal Q3. The high signal Q3 is inputted to the first OR gate 305, thereby stopping the operation of the counter 302. The high signal Q3 input to the second OR gate 309 outputs a high signal to the selector terminal of the line selector 310. Therefore, the line selector 310, after system initialization operation is performed successfully, selects between the normal higher flash address (MFADDR) input from the system control unit 220 by the CPU 210 and the higher address (SMADDR) of the system initialization code copy physically fixed and outputs the higher flash address (MFADDR) to the flash memory 230. That is, thereafter the operation of executing or updating of the master code source or copy is carried out.

If system initialization is not performed until the counter 302 counts time $T_1$ due to the damage of the system initialization code source, the counter 302 outputs the high signal(RCO) during time $T_2$ as shown in FIG. 8(d). Accordingly, the output $\overline{RCO}$ becomes low during $T_2$ as shown in FIG. 8(e), so that the output signal(MRST*) of the AND gate 306 becomes low as shown in FIG. 8(b), and thus, the system is reset again. And, as the output $\overline{RCY}$ of the inverter 303 becomes low, the first D F/F 304 maintains the terminal Q2 in a low state and the terminal Q3 in a high state.

In the above, $T_1$ represents time for checking if the system initialization code operates normally, and $T_2$ represents a period of Ck of the counter. $T_1$ is set higher than the time $T_3$ at which the system initialization code completes an actual operation ($T_1 >> T_3$), and this setting can be done by controlling the count of the counter 302.

Since a system initialization is not performed, the flash address(FADDR) inputted through the system control unit 220 does not accord with the starting address of the master code source physically fixed. Thus the output signal Q4 of the comparator 307 remains low as shown in FIG. 8(h), and the output Q3 of the second D F/F 308 also remains low as shown in FIG. 8(i).

Thereafter, when the time $T_2$ have elapsed and thereby the output of the counter 302 becomes low, the output (MRST*) of the AND gate 306 become high again as shown in FIG. 8(b) and the output $\overline{RCO}$ of the inverter 303 is translated from low to high. Thus the first D F/F 304 translates the terminal Q2 into a high state and the terminal $\overline{Q2}$ into a low state as shown in FIG. 8(g).

Accordingly, the counter 302 which is applied the high output signal Q2 of the first D F/F 304 to the enable terminal $\overline{EN}$ through the first OR gate 305 does not operate. As the output of the second OR gate 309 to which the low signal Q2 of the first D F/F 304 and the low signal Q3 of the second D F/F 308 are inputted becomes low during $T_3$ as shown in FIG. 8(j), the line selector 310 outputs a higher address SMADDR of the system initialization code copy physically fixed to the flash memory 230. Because the output CFADDR of the line selector 310, the CPU 210 carries out a system initialization during $T_3$ by executing the system initialization code copy stored in the flash memory 230.

When the system initialization is completed by the execution of the system initialization code copy, the CPU 210 inputs the address of the master code source to the address control unit 280-2 by controlling the system control unit 220.

At this time, since the address of the master code source and the starting address MSADDR of the master code source physically fixed are identical, the comparator 307 and the second D F/F 308 outputs a high signal. Accordingly, the output of the second OR gate 309 becomes high, and thereby the line selector 310 selects a higher flash address MFADDR inputted from the system control unit 220 by the CPU 210 and outputs it to the flash memory 230. That is, thereafter the operation of executing or updating the master code source or copy is carried out.

In the case that the system initialization code source is damaged, the present invention initialize the system by a higher address of the system initialization code copy physically fixed in order to execute the system initialization code copy.

Meanwhile, the flash address FADDR inputted to the comparator 307 accords with the starting address of the master code source physically fixed only when a system initialization is completed successfully, so that the second D F/F 308 maintains a high output Q3 state. Therefore, the line selector 310 is fixed so as to selectively output a higher address MFADDR, and the higher flash address MFADDR is inputted to the flash memory 230 along with a lower flash address LFADDR.

When the system initialization is completed by the above process, the operation for updating the master code source/ copy and the system initialization code is executed. The description thereof will now be explained referring to FIG. 6.

Figure 6A:
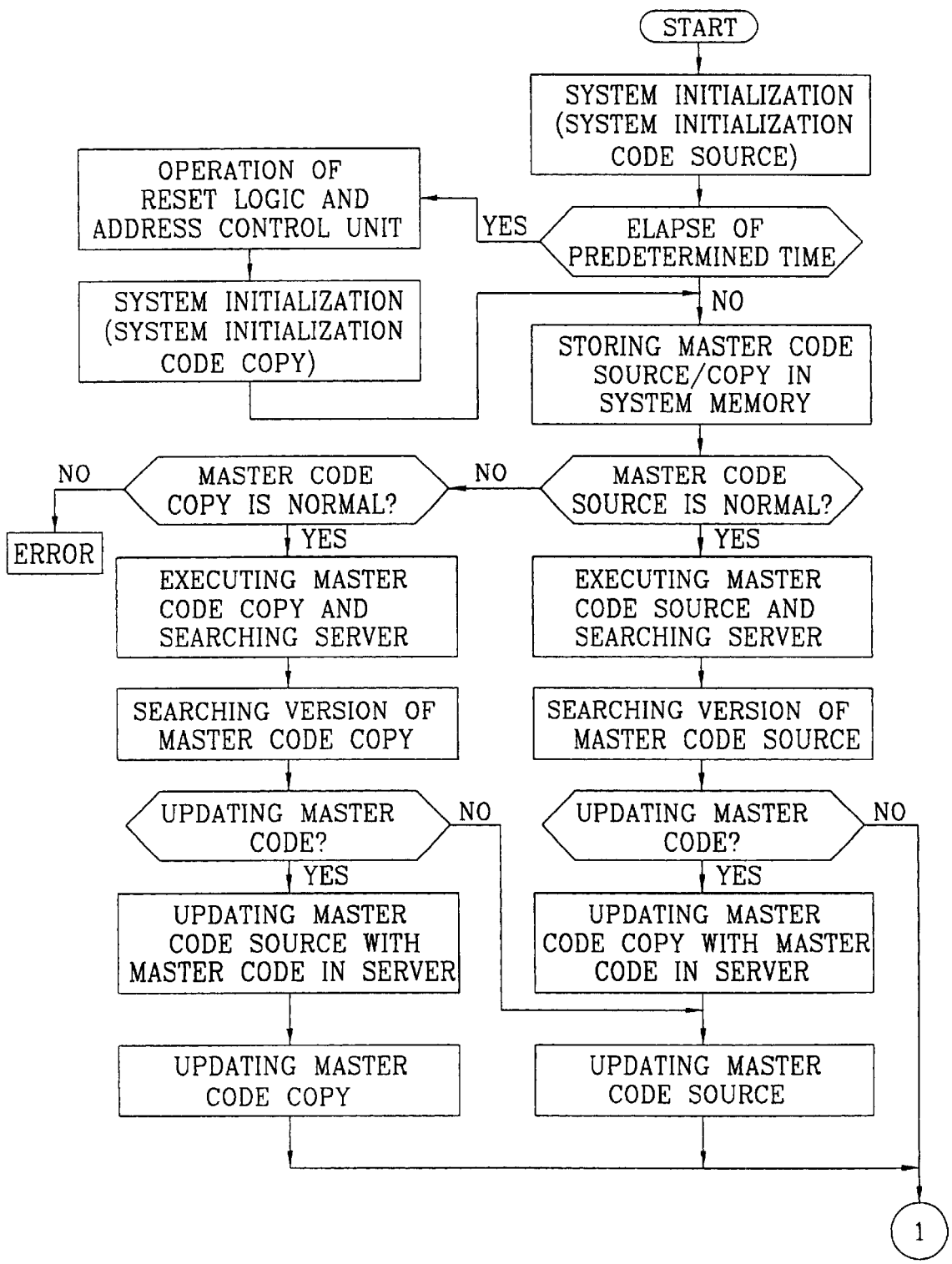
FIG. 6 is a flow chart for the embodiment of the present invention.
Figure 6B:
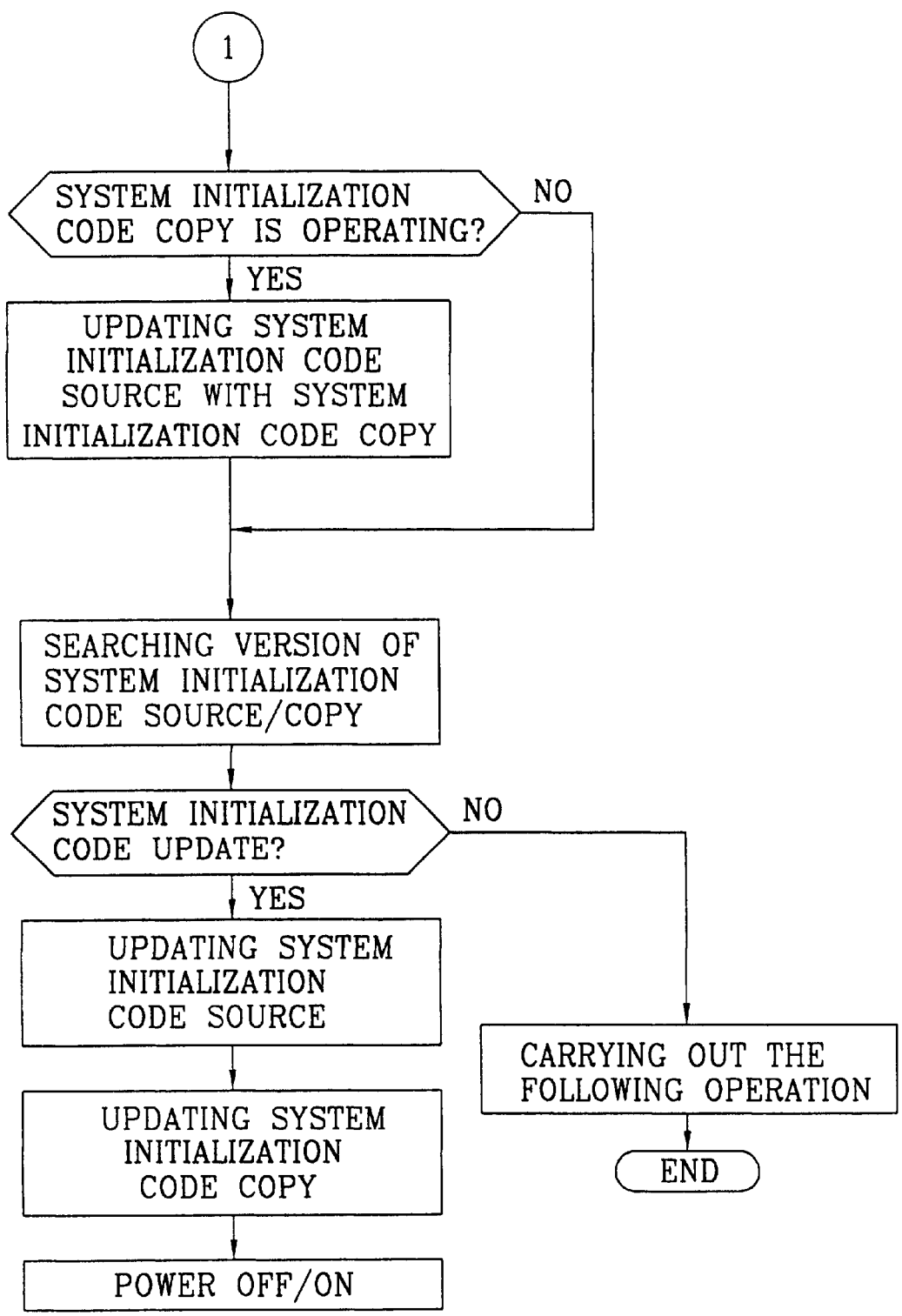

FIGS. 6A and 6B are flow charts for a first embodiment of the present invention.

When system initialization is completed, the CPU 210 loads the master code source and copy stored in the flash memory 230 to the system memory 240 through the system control until 220, and then checks the checksum of the master code source. If there is nothing wrong with the result, the CPU determines the master code source as normal and executes the master code source, and then determines whether the master code source needs updating or not by searching a server through a network interface unit 250. If the master code source requires to be updated to a new version, the CPU 210 updates the master code source after updating the master code copy of the flash memory 230 with the master code of the server.

Meanwhile, if the master code source is determined as abnormal, the CPU 210 checks the checksum of the master code copy.

If the master code copy is abnormal, the CPU 210 outputs an error message.

If the master code copy is normal, the CPU executes the master code copy, and then determines whether the master code copy needs update or not by searching a server through a network interface unit 250. If the master code copy requires updating the master code copy of the flash memory 230 with the master code of the server.

If the master code copy does not require updating based on results of comparing the master code copy with the master code of the server, the CPU 210 updates the master code source stored in the flash memory 230. The reason to update only the master code source is because, as described in the prior art, the master code source was determined damaged before executing the master code copy.

When the step for updating the master code is completed, the CPU 210 determines if a system initialization code copy is used in a system initialization operation. If the system initialization code copy is used, that means that the system initialization code source stored in the flash memory 230 is damaged. Thus, the CPU 210 updates the system initialization code source.

If the system initialization code source is updated with the system initialization code copy by a normal operation of system initialization code source or by an operation of the system initialization code copy, the CPU 210 compares the system initialization code of the server with the system initialization code source/copy stored in the flash memory 230 and determines whether the system initialization code needs updating or not.

If the system initialization code does not require updating, the CPU 210 carries out the following operation according to the signal of a keyboard or a mouse being input through the user interface unit 260 and displays the progress of the operation on a display device through a VGA interface unit 270.

If the system initialization code requires updating, the CPU 210 updates the system initialization code source stored in the flash memory 230 with the system initialization code, and then updates the system initialization code copy. Thereafter, power off/on is carried out to implement the updated system initialization code and the updated master code and thereby to actuate the system.

As described above, the present invention, in a system employing a memory which is possible to update a program, has an effect of safely updating the entire system software including a system initialization code to a new version is by adding an initialization code control unit including reset logic and an address control unit and providing the system initialization code copy.

What is claimed is:

1. In a communication terminal system which includes a network interface and updated data of a memory from a remote server, a program updating apparatus for a communication terminal system, comprising:

a memory having a master code and a system initialization code stored therein; and an initialization code control unit for controlling selection of an address of the memory so that a system initialization code copy may be executed after resetting the communication terminal system if a system initialization code source stored in the memory executes improperly, wherein the initialization code control unit comprises:

first means for determining whether or not the system initialization code source is normal;

second means for resetting the system if the first means determines that the system initialization code source is not normal; and third means for providing address information of the system initialization code copy stored in the memory, automatically, if the second means resets the system.

2. The apparatus of claim 1, wherein the first means compares an address of a master code source of the memory physically fixed with an address of the memory input after system initialization, and determines whether or not the master code is normal according to the result of the comparison.

3. The apparatus of claim 1, wherein the third means uses an address of the system initialization code copy physically fixed.

4. The apparatus of claim 1, wherein the third means provides the address information of the system initialization code copy, which identifies a higher address of the memory than an address of the system initialization code source in the memory.

5. The apparatus of claim 1, wherein the third means includes:

a line selector selecting one of a normal flash memory address and a higher address of the system initialization code copy according to an input selector terminal signal.

6. The apparatus of claim 5, wherein the third means further includes:
a logic gate providing the selector terminal signal to the line selector based on input and output signals of the first means.

7. The apparatus of claim 6, wherein the logic gate is an OR gate.

8. In a program updating method for updating data from a remote server using a network, a program updating method for a communication terminal system, the method comprising:
a first step of determining whether or not a system initialization code source of a memory is executed;
a second step of executing a system initialization code copy of the memory according to the result of the first step;
a third step of determining whether a master code source or a master code copy of the memory requires updating or not after executing the system initialization code source or the system initialization code copy, and then, updating the master code source or copy with a master code of a server according to the result of this determination;
a fourth step of determining whether the system initialization code source or the system initialization code copy requires updating or not when the update of the master code source or the master code copy of the memory is completed; and
a fifth step of sequentially updating the system initialization code source or the system initialization code copy of the memory with a system initialization code of a remote server when it is determined that the system initialization code source or the system initialization code copy requires updating.

9. The method of claim 8, wherein the third step further comprises:
a first process of determining whether the master code source of the memory is normal or not;
a second process of determining whether the master code source requires updating or not by comparing the master code source of the memory with the master code of the remote server after executing the master code source if the master code source is normal;
a third process of determining whether the master code copy is normal or not if the master code source of the memory is not normal;
a fourth step of determining whether the master code copy requires updating or not by comparing the master code copy of the memory with the master code of the remote server, after executing the master code copy if the master code copy is normal; and
a fifth process of outputting an error message if the master code copy of the memory is not normal.

10. The method of claim 8, wherein the fourth step further comprises:
a first process of determining whether the system initialization code copy of the memory has been executed;
a second process of updating the system initialization code source of the memory with the system initialization code copy if the system initialization code copy has been executed;
a third process of determining whether the system initialization code copy requires updating or not by comparing it with the system initialization code of the remote server; and
a fourth process of determining whether the system initialization code source of the memory requires updating by comparing it with the system initialization code of the remote server if the system initialization code source of the memory has been executed at an early stage.

11. The method of claim 8, wherein the second step includes:
resetting the communication terminal system if the first step determines that the system initialization code source of the memory is not executed.

12. The method of claim 11, wherein the second step further includes:
providing address information of the system initialization code copy of the memory, automatically, if the resetting resets the communication terminal system, whereby the system initialization code copy can be accessed.

13. The method of claim 8, further comprising:
prestoring the system initialization code source, the system initialization code copy, the master code source, and the master code copy in the memory.

* * * * *